(12) United States Patent
Tang et al.

(10) Patent No.: US 10,937,210 B2
(45) Date of Patent: Mar. 2, 2021

(54) METHOD FOR RECONSTRUCTING PORE STRUCTURE OF CORE WITH MICRO-CT (COMPUTED TOMOGRAPHY)

(71) Applicant: China University of Petroleum (East China), Qingdao (CN)

(72) Inventors: Mingming Tang, Shandong (CN); Shuangfang Lu, Shandong (CN); Yang Gao, Shandong (CN); Shunwei Wu, Shandong (CN); Jing Zhang, Shandong (CN); Haisheng Hu, Shandong (CN); Wenbiao Huang, Shandong (CN); Huifang Ma, Shandong (CN); Jiafan Tang, Shandong (CN); Hongkun Tan, Shandong (CN); Changhong Chu, Shandong (CN)

(73) Assignee: CHINA UNIVERSITY OF PETROLEUM (EAST CHINA), Qingdao (CN)

(*) Notice: Subject to any disclaimer, the term of this patent is extended or adjusted under 35 U.S.C. 154(b) by 127 days.

(21) Appl. No.: 16/395,060

(22) Filed: Apr. 25, 2019

(65) Prior Publication Data
US 2019/0251715 A1 Aug. 15, 2019

(30) Foreign Application Priority Data
Apr. 28, 2018 (CN) .......................... 201810397176.3

(51) Int. Cl.
*G06T 11/00* (2006.01)
*G06T 7/49* (2017.01)
(Continued)

(52) U.S. Cl.
CPC ............ *G06T 11/008* (2013.01); *G01N 1/286* (2013.01); *G01N 15/08* (2013.01); *G06T 7/11* (2017.01);
(Continued)

(58) Field of Classification Search
CPC . G06T 11/008; G06T 7/49; G06T 7/11; G06T 7/136; G06T 2207/10081;
(Continued)

(56) References Cited

U.S. PATENT DOCUMENTS

| 10,198,804 B2* | 2/2019 | Sungkorn | G06K 9/00201 |
| 2012/0221306 A1* | 8/2012 | Hurley | G01V 99/005 |
| | | | 703/6 |

(Continued)

OTHER PUBLICATIONS

Shiq Liu et al., "FIB-SEM and X-ray CT characterization of interconnected pores in highrank coal formed from regional metamorphism", Oct. 5, 2016, Journal of Petroleum Science and Engineering, 148(2017) 21-31 (Year: 2016).*

(Continued)

*Primary Examiner* — Ming Y Hon

(57) ABSTRACT

A reconstruction method for a pore structure of a core with micro-CT (Computed Tomography) is provided. With utilizing a FIB-SEM (Focused Ion Beam-Scanning Electron Microscope) experiment, an actual porosity corresponding to a grey level in micro-CT results is obtained, so as to establish a relationship between the grey level of a micro-CT image and the porosity. Thereafter, according to the above relationship, a certain porosity is assigned to each pixel in the micro-CT image, so as to establish a soft segmentation method of the pore structure. The reconstruction method provided by the present invention discloses a soft segmentation method for digital reconstruction of the pore structure of the core combined with FIB-SEM data and micro-CT data, and establishes a fractional digital pore structure model of the core, which further improves a matching degree between the digital pore structure model of the core and an actual core.

4 Claims, 2 Drawing Sheets

(51) Int. Cl.
*G06T 7/11* (2017.01)
*G01N 1/28* (2006.01)
*G06T 7/136* (2017.01)
*G01N 15/08* (2006.01)

(52) U.S. Cl.
CPC ............ *G06T 7/136* (2017.01); *G06T 7/49* (2017.01); *G01N 2001/2866* (2013.01); *G06T 2207/10061* (2013.01); *G06T 2207/10081* (2013.01)

(58) Field of Classification Search
CPC ......... G06T 2207/10061; G06T 11/006; G06T 2207/20128; G06T 7/001; G06T 7/174; G06T 2207/30184; G01N 15/08; G01N 1/286; G01N 2001/2866; G01N 2015/0846; G01N 15/088
See application file for complete search history.

(56) References Cited

U.S. PATENT DOCUMENTS

| | | | | |
|---|---|---|---|---|
| 2013/0238304 | A1* | 9/2013 | Glinsky | G01V 99/005 |
| | | | | 703/6 |
| 2014/0019053 | A1* | 1/2014 | de Prisco | E21B 49/00 |
| | | | | 702/12 |
| 2014/0044315 | A1* | 2/2014 | Derzhi | G06T 7/0004 |
| | | | | 382/109 |
| 2015/0331145 | A1* | 11/2015 | Grachev | G06F 17/10 |
| | | | | 703/2 |
| 2016/0093094 | A1* | 3/2016 | Walls | G01N 15/088 |
| | | | | 382/109 |

OTHER PUBLICATIONS

Bijoyendra Bera et al., "Understanding the micro structure of Berea Sandstone by the simultaneous use of micro-computed tomography (micro-CT) and focused ion beam-scanning electron microscopy (FIB-SEM)", Dec. 7, 2010, Micron 42(2011) 412-418 (Year: 2010).*

* cited by examiner

METHOD FOR RECONSTRUCTING PORE STRUCTURE OF CORE WITH MICRO-CT (COMPUTED TOMOGRAPHY)

CROSS REFERENCE OF RELATED APPLICATION

The application claims priority under 35 U.S.C. 119(a-d) to CN 201810397176.3, filed Apr. 28, 2018.

BACKGROUND OF THE PRESENT INVENTION

Field of Invention

The present invention relates to a field of unconventional reservoir micro-technology, and more particularly to a method for reconstructing a pore structure of a core with micro-CT (Computed Tomography).

Description of Related Arts

With the gradual exhaustion of the conventional oil and gas resources, the unconventional oil and gas, such as shale gas, shale oil, and tight oil and gas, has become one of the research hotspots in the current oil and gas field. However, the actual development of the unconventional oil and gas indicates the unique declining curve of the unconventional oil and gas that: in the early stage, the productivity is high and the declining rate is fast; in the later stage, the declining rate is slow and the productivity is low. In order to analyze the flow pattern of the shale gas and oil, it is required to carry out the digital core research, so as to represent the microscopic three-dimensional pore-fracture structure of the unconventional reservoir.

In the unconventional reservoir, the pores and the fractures of about 20 nm to 10 μm are both developed. However, the resolution of the conventional micro-CT (Computed Tomography) scanner is larger than 100 nm. Therefore, a three-dimensional pixel block in the conventional micro-CT scanning will face three conditions that: (1), the entire area is solid (shown as the a4 area in FIG. 4a); (2), the entire area is pores (shown as the a3 area in FIG. 4a); and (3), part of the area is solid and part of the area is pores (shown as the a1 and a2 areas in FIG. 4a). There are also three conditions of the conventional micro-CT data (as shown in FIG. 4b) that: (1), it is a black area (shown as the b3 pixel in FIG. 4b, corresponding to the a3 area in FIG. 4a); (2), it is a white area (shown as the b4 pixel in FIG. 4b, corresponding to the a4 area in FIG. 4a); and (3), it is a grey area (shown as the b1 and b2 pixels in FIG. 4b, corresponding to the a1 and a2 areas in FIG. 4a).

FIG. 4a shows distributions of pores and solid of the core; and FIG. 4b shows a micro-CT scanning image corresponding to FIG. 4a. In FIG. 4b, each block is one pixel, and the side length of the pixel corresponds to the resolution of the micro-CT scanner (about 0.7-20 μm). The micro-CT scanning results in FIG. 4b are processed with hard segmentation with the uniform threshold that: the whole pixel is taken as a unit; the entire b1 pixel and b2 pixel are determined either as pores (with a porosity Fp=1) or as solid (with a porosity Fp=0). Actually, the a1 and a2 areas of the core, corresponding to the b1 pixel and b2 pixel, are mixtures of pores and solid; and the actual porosity Fp of single pixel block is a fraction changing from 0 to 1.

Conventionally, the digital reconstruction of the pore structure of the core based on CT generally adopts the hard segmentation method that: for any three-dimensional pixel in CT scanning, a single segmentation threshold Th is firstly determined; a part with the grey level value larger than Th in the three-dimensional CT data volume is a pore-fracture structure and assigned with 0; and a part with the grey level value smaller than Th in the three-dimensional CT data volume is solid and assigned with 1.

For the digital reconstruction of the pore structure of the core with the hard segmentation method, there are errors existing in the partial-pore and partial-solid pixel that: according to the current pore segmentation method, the entire b1 pixel and b2 pixel in FIG. 4b are determined either as pores or as solid, which is not conformed with the actual situation.

SUMMARY OF THE PRESENT INVENTION

There are problems existing in digital reconstruction of a pore structure of a core with a hard segmentation method. That is to say, because resolution of a micro-CT (Computed Tomography) scanner is limited, the pore structure below the resolution is unable to be distinguished; therefore, each CT pixel is processed with hard segmentation with a uniform threshold; the entire CT pixel is determined either as pores with a pixel porosity of Fp=1 or as solid with a pixel porosity of Fp=1. Actually, in an area of the pore corresponding to a size of a CT pixel block, pores exist in a form of fraction, not limited to 0 or 1, and the porosity is a fraction.

In order to solve the above problems, the present invention provides a soft segmentation method, which does not divide the micro-CT pixel merely into pores and solid, but establishes a relationship between a grey level of a CT image and an actual core porosity in a FIB-SEM (Focused Ion Beam-Scanning Electron Microscope) experiment according to the grey level of the CT image combined with the high-resolution FIB-SEM experiment.

Technical solutions of the present invention are described as follows.

With utilizing the FIB-SEM experiment, an actual porosity corresponding to the grey level in the micro-CT result is obtained, so as to establish a relationship between the grey level of the micro-CT image and the porosity. Thereafter, according to the above relationship, a certain porosity is assigned to each pixel in the micro-CT image, so as to establish the soft segmentation method of the pore structure.

A method for reconstructing a pore structure of a core with micro-CT comprises steps of:

(1), preparing a micro-CT core sample, particularly comprising steps of:

processing a collected primary rock sample with surface mechanical polishing; and, at an area required to develop a micro-CT analysis; drilling to obtain the micro-CT core sample CT_SAMPLE; wherein: the sample has a diameter of CTR mm and an axial length of CTZ mm; for the micro-CT core sample, a first end with a mechanically polished surface is denoted as an A end of the sample, and the other end is denoted as a B end;

(2), processing the micro-CT core sample with surface ion polishing, particularly comprising steps of:

processing the A end of the micro-CT core sample with argon ion surface polishing, wherein a polishing area is an end surface of the whole A end; then processing the end surface of the A end after ion polishing with SEM scanning; photographing, and obtaining a surface structure image of the end surface of the A end;

(3), punching locating holes and micro-CT scanning, particularly comprising steps of:

according to image results of SEM scanning of the A end, determining a square area SQU with a side length of SEMQ μm on the end surface of the A end; in the square area SQU, selecting three locating points, respectively PA, PB and PC, wherein the three points are required to constitute a rectangular coordinate relation; and, processing the micro-CT core sample CT_SAMPLE after punching the locating holes thereon with micro-CT scanning, wherein a scanning image accuracy is CTN μm, and a scanning result is a three-dimensional pixel matrix CT_DATA;

the step (3) particularly comprising steps of:

(31), according to the image results of SEM scanning of the A end, determining the square area SQU with the side length of SEMQ μm on the end surface of the A end;

(32), in the square area SQU, selecting three locating points, respectively PA, PB and PC, wherein the three points are required to constitute a rectangular coordinate relation;

(33), punching three locating holes of different shapes at positions of the three locating points with a focused ion beam, wherein:

at the PA point, a cylindrical hole with a diameter of 3*CFN μm and an axial length of 3*CTN μm is punched; at the PB point, a cubic hole with a side length of 3*CTN μm is punched; at the PC point, a triangular prism hole with a regular triangle surface is punched, wherein the triangular prism hole has a side length of 3*CTN μm and a vertical depth of 3*CTN μm; and (34), processing the micro-CT core sample CT_SAMPLE after punching the locating holes thereon with micro-CT scanning, wherein the scanning image accuracy is CTN μm, and the scanning result is a three-dimensional pixel matrix CT_DATA;

(4), FIB-SEM scanning, particularly comprising steps of:

processing the micro-CT core sample CT_SAMPLE after punching the locating holes thereon with FIB-SEM scanning, wherein: a scanning area is the SQU area; a vertical cut-in depth is SEMQ μm; a horizontal FIB ablation interval is FIBN nm; and an accuracy of FIB-SEM scanning is FIBN nm; and, after FIB-SEM scanning, obtaining a cubic core three-dimensional pixel matrix FIB-SEM_DATA with a side length of SEMQ μm;

(5), matching data of micro-CT scanning and FIB-SEM scanning, therein:

in the step (3), three locating holes can be observed in the micro-CT scanning result, respectively $PA^{CT}$, $PC^{CT}$ and $PC^{CT}$; meanwhile, three locating holes can also be observed in the FIB-SEM scanning result, respectively $PA^{FIB}$, $PB^{FIB}$, and $PC^{FIB}$; $PA^{CT}$, $PB^{CT}$, $PB^{CT}$ respectively correspond to $PA^{FIB}$, $PB^{FIB}$, and $PC^{FIB}$; and, according to $PA^{CT}$, $PB^{CT}$, $PC^{CT}$, $PA^{FIB}$, $PB^{FIB}$, and $PC^{FIB}$, positions of the micro-CT scanning data CT-DATA and the FIB-SEM scanning data FIB-SEM_DATA are matched;

the step (5) particularly comprising steps of:

(51), determining centers of the three locating holes in the micro-CT data; and, through taking a center of the $PA^{CT}$ hole as an origin of a coordinate system, taking $PA^{CT}$-$PB^{CT}$ as an x-axis, taking $PA^{CT}$-$PC^{CT}$ as a y-axis, and taking a direction vertical to the polished surface as a z-axis, establishing a micro-CT data coordinate system CT SYSTEM;

(52), determining centers of the three locating holes in the FIB-SEM data; and, through taking a center of the $PA^{FIB}$ hole as an origin of a coordinate system, taking $PA^{FIB}$-$PB^{FIB}$ as an x-axis, taking $PA^{FIB}$-$PC^{FIB}$ as a y-axis, and taking a direction vertical to the polished surface as a z-axis, establishing a FIB-SEM data coordinate system FIB_SYSTEM;

(53), $PA^{CT}$, $PB^{CT}$, and $PC^{CT}$ respectively corresponding to $PA^{FIB}$, $PB^{FIB}$, and $PC^{FIB}$, wherein: there is only a scaling factor SF=CTN/FIBN*$10^6$ between the micro-CT data coordinate system CT_SYSTEM and the FIB-SEM data coordinate system FIB_SYSTEM; and (54), in an overlap area of FIB-SEM scanning and micro-CT scanning, coordinates of one pixel $P^{CT}$ in the micro-CT data in the micro-CT data coordinate system CT_SYSTEM being $P^{CT}\_X$, $P^{CT}\_Y$, and $P^{CT}\_Z$; because the FIB-SEM data has higher resolution than the micro-CT data, for a pixel block $P^{FIB}$ in the FIB-SEM data corresponding to one pixel $P^{CT}$ in the micro-CT data, an x-axis range being $P^{CT}\_X$*SF to $(P^{CT}\_X+1)$*SF, a y-axis range being $P^{CT}\_Y$*SF to $(P^{CT}\_Y+1)$*SF, and a z-axis range being $P^{CT}\_Z$*SF to $(P^{CT}\_Z+1)$*SF, (6), analyzing porosity of the FIB-SEM data, particularly comprising steps of:

through the step (5), establishing the pixel block $P^{FIB}$ in one-to-one correspondence with the micro-CT data in the FIB-SEM high-resolution data; because the FIB-SEM data in the $P^{FIB}$ has a relatively high resolution, processing with hard segmentation; and determining a porosity $FP^{FIB}$ of a pore part of the FIB-SEM data in the $P^{FIB}$;

the step (6) particularly comprising steps of:

(61), firstly determining an initial segmentation threshold $Th*^{FIB}$, wherein a part in the FIB-SEM image of the $P^{FIB}$ smaller than $Th*^{FIB}$ is pores, and a part larger than $Th*^{FIB}$ is solid matrix; continuously adjusting the segmentation threshold, until a position of the pore edge after finishing segmenting is matched with a position of the pore edge in the original FIB-SEM image of the $P^{FIB}$, and taking the current segmentation threshold as an optimal segmentation threshold $Th^{FIB}$; and (62), after determining the optimal segmentation threshold, segmenting the FIB-SEM image in the $P^{FIB}$, wherein an amount of pixels for pore segmentation is counted to be $Por^{FIB}$, a total pixel amount of the $P^{FIB}$ is counted to be $Pix^{FIB}$, and the porosity of the $P^{FIB}$ is $FP^{FIB}=Por^{FIB}/Pix^{FIB}$;

(7), analyzing a relationship between a grey level of the micro-CT data and the porosity of the FIB-SEM data, particularly comprising steps of:

through the step (5), establishing a one-to-one correspondence relationship between the $P^{CT}$ of the micro-CT data and the $P^{FIB}$ of the FIB-SEM high-resolution data; and, through the step (6), obtaining the porosity $FP^{FIB}$ of the $P^{FIB}$, so as to establish a polynomial fitting relationship $FP^{FIB}=f(G^{CT})$ between the grey level $G^{CT}$ of the $P^{CT}$ and the porosity $FP^{FIB}$ with utilizing a least square method; and (8), establishing a pore structure model with soft segmentation of micro-CT, particularly comprising steps of:

with utilizing the fitting relationship $FP^{FIB}=f(G^{CT})$ between the grey level of the pixel in the micro-CT image and the porosity in the step (7), through introducing a value of the grey level of the micro-CT image, obtaining the porosity of other data in the micro-CT scanning data, and obtaining the porosity FP of every pixel in all the micro-CT scanning data; and establishing a pixel matrix FP_DATA which has a same size and a one-to-one correspondence with the micro-CT scanning data CT_DATA, wherein a value of the FP_DATA is the porosity FP of the corresponding pixel in the CT_DATA, and FP_DATA is a final outputted soft-segmented pore structure reconstruction model.

The reconstruction method for the pore structure of the core with micro-CT, provided by the present invention, discloses a soft segmentation method for the digital is reconstruction of the pore structure of the core combined with the FIB-SEM data and the micro-CT data, and establishes a fractional digital pore structure model of the core, which further improves the matching degree between the digital pore structure model of the core and the actual core.

BRIEF DESCRIPTION OF THE DRAWINGS

FIG. 4b is a CT scanning image corresponding to FIG. 4a.

DETAILED DESCRIPTION OF THE PREFERRED EMBODIMENT

Detailed technical solutions of the present invention are illustrated with the accompanying drawings as follows.

Figure 1:
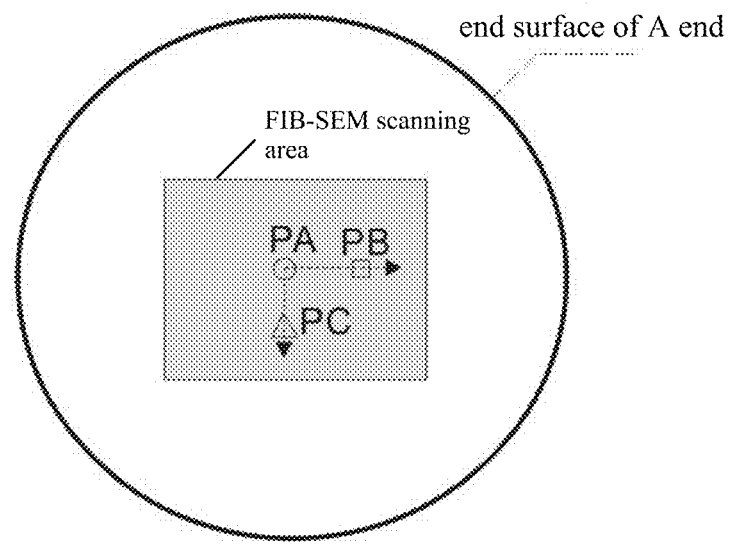
FIG. 1 is a sketch view of locating points and locating holes on an end surface of an A end of a micro-CT core sample according to the present invention.
Figure 2:
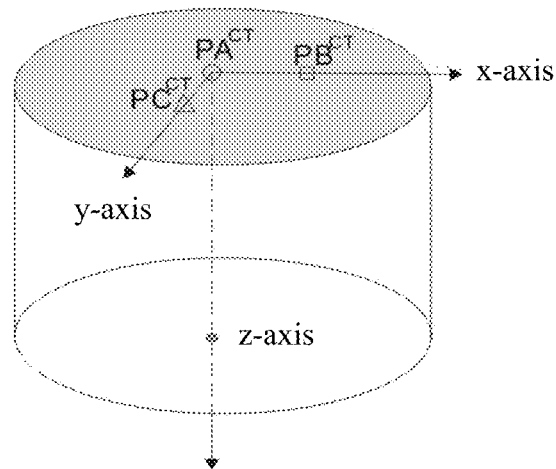
FIG. 2 is a sketch view of a micro-CT data coordinate system CT_SYSTEM according to the present invention.
Figure 3:
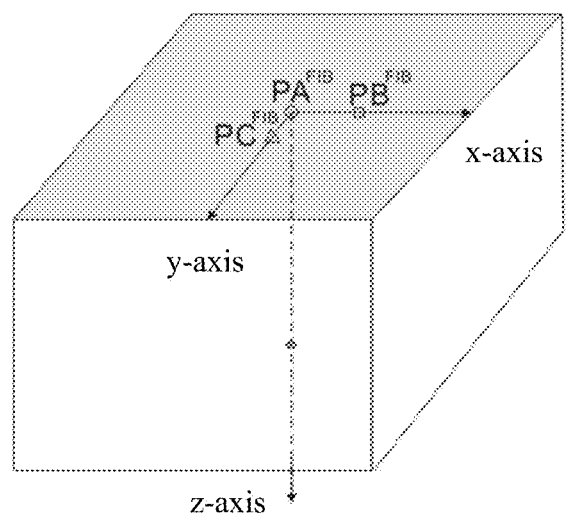
FIG. 3 is a sketch view of a FIB-SEM data coordinate system FIB SYSTEM according to the present invention.
Figure 4A:
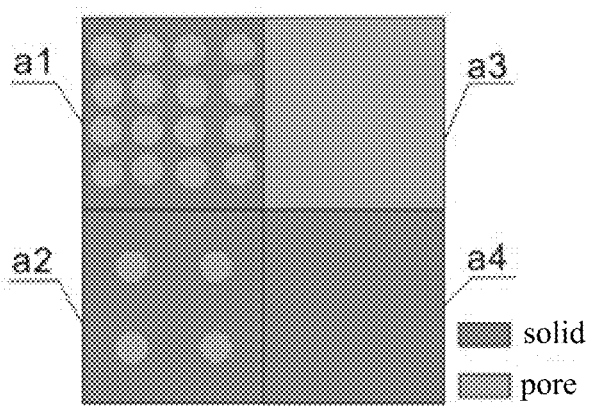
FIG. 4a shows distributions of pores and solid of a core in prior art.
Figure 4B:
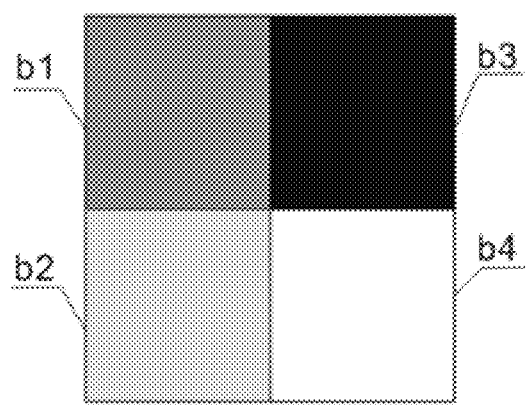

A method for reconstructing a pore structure of a core with micro-CT (Computed Tomography) comprises steps of:

(1), preparing a micro-CT core sample, wherein: a resolution of a selected micro-CT scanner is CTN μm (generally 1 μm); a sample required by the micro-CT scanner is a cylindrical plunger; for the plunger sample, a diameter is required to be CTR mm, and an axial length is required to be CTZ mm;

the step (1) particularly comprising steps of:

processing a collected primary rock sample with surface mechanical polishing; and, at an area required to develop a micro-CT analysis, drilling to obtain the micro-CT core sample CT_SAMPLE; wherein: the sample has a diameter of CTR mm and an axial length of CTZ mm; for the micro-CT core sample, a first end with a mechanically polished surface is denoted as an A end of the sample, and the other end is denoted as a B end;

(2), processing the micro-CT core sample with surface ion polishing, particularly comprising steps of:

processing the A end of the micro-CT core sample with argon ion surface polishing, wherein a polishing area is an end surface of the whole A end; then processing the end surface of the A end after ion polishing with SEM (Scanning Electron Microscope) scanning; photographing, and obtaining a surface structure image of the end surface of the A end;

(3), punching locating holes and micro-CT scanning, particularly comprising steps of:

(31), according to image results of SEM scanning of the A end, determining a square area SQU with a side length of SEMQ μm on the end surface of the A end, shown as a FIB-SEM (Focused Ion Beam-Scanning Electron Microscope) scanning area in FIG. 1;

(32), in the square area SQU, selecting three locating points, respectively PA, PB and PC, wherein the three points are required to constitute a rectangular coordinate relation, as shown in FIG. 1;

(33), punching three locating holes of different shapes at positions of the three locating points with a focused ion beam (FIB), wherein:

at the PA point, a cylindrical hole with a diameter of 3*CTN μm and an axial length of 3*CTN μm is punched; at the PB point, a cubic hole with a side length of 3*CTN μm is punched; at the PC point, a triangular prism hole with a regular triangle surface is punched, wherein the triangular prism hole has a side length of 3*CTN μm and a vertical depth of 3*CTN μm; because sizes of the PA, PB and PC holes are all larger than the resolution of CTN μm of the micro-CT scanner, it is guaranteed that the three locating holes can be showed in micro-CT scanning; and (34), processing the micro-CT core sample CT SAMPLE after punching the locating holes thereon with micro-CT scanning, wherein a scanning image accuracy is CTN μm, and a scanning result is a three-dimensional pixel matrix CT_DATA, (4), FIB-SEM scanning, particularly comprising steps of:

processing the micro-CT core sample CT_SAMPLE after punching the locating holes thereon with FIB-SEM scanning, wherein: a scanning area is the SQU area; a vertical cut-in depth is SEMQ μm; a horizontal FIB ablation interval is FIBN nm (generally 10 nm); and an accuracy of FIB-SEM scanning is FIBN nm; and, after FIB-SEM scanning, obtaining a cubic core three-dimensional pixel matrix FIB-SEM_DATA with a side length of SEMQ μm;

(5), matching data of micro-CT scanning and FIB-SEM scanning, wherein:

in the step (3), three locating holes are able to be observed in the micro-CT scanning result, respectively $PA^{CT}$, $PB^{CT}$, and $PC^{CT}$; meanwhile, three locating holes can also be observed in the FIB-SEM scanning result, respectively $PA^{FIB}$, $PB^{FIB}$, and $PC^{FIB}$; $PA^{CT}$, $PB^{CT}$, and $PC^{CT}$, $PA^{FIB}$, $PB^{FIB}$, and $PC^{FIB}$ are all actual scanning results of the three locating holes of PA, PB and PC in the rock; $PA^{CT}$, $PB^{CT}$, and $PC^{CT}$ respectively correspond to $PA^{FIB}$, $PB^{FIB}$, and $PC^{FIB}$; and, according to $PA^{CT}$, $PB^{CT}$, and $PC^{CT}$, $PA^{FIB}$, $PB^{FIB}$, and $PC^{FIB}$, positions of the micro-CT scanning data CT-DATA and the FIB-SEM scanning data FIB-SEM_DATA are matched;

the step (5) particularly comprising steps of:

(51), determining centers of the three locating holes in the micro-CT data; and, through taking a center of the $PA^{CT}$ hole as an origin of a coordinate system, taking $PA^{CT}$-$PB^{CT}$ as an x-axis, taking $PA^{CT}$-$PC^{CT}$ as a y-axis, and taking a direction vertical to the polished surface as a z-axis, establishing a micro-CT data coordinate system CT_SYSTEM, as shown in FIG. 2;

(52), determining centers of the three locating holes in the FIB-SEM data; and, through taking a center of the $PA^{FIB}$ hole as an origin of a coordinate system, taking $PA^{FIB}$-$PB^{FIB}$ as an x-axis, taking $PA^{FIB}$-$PC^{FIB}$ as a y-axis, and taking a direction vertical to the polished surface as a z-axis, establishing a FIB-SEM data coordinate system FIB_SYSTEM, as shown in FIG. 3;

(53), $PA^{CT}$, $PB^{CT}$, and $PC^{CT}$ respectively corresponding to $PA^{FIB}$, $PB^{FIB}$, and $PC^{FIB}$, wherein: there is only a scaling factor SF=CTN/FIBN*$10^6$ between the micro-CT data coordinate system CT_SYSTEM and the FIB-SEM data coordinate system FIB_SYSTEM; and (54), in an overlap area of FIB-SEM scanning and micro-CT scanning, such as a grey area in FIG. 1, coordinates of one pixel $P^{CT}$ in the micro-CT data in the micro-CT data coordinate system $CT^{CT}$SYSTEM being $P^{CT}\_X$, $P^{CT}\_Y$, and $P^{CT}\_Z$; because the FIB-SEM data has higher resolution than the micro-CT data, for a pixel block $P^{FIB}$ in the FIB-SEM data corresponding to one pixel $P^{CT}$ in the micro-CT data, an x-axis range being $P^{CT}\_X*SF$ to $(P^{CT}\_X+1)*SF$, a y-axis range being $P^{CT}\_Y*SF$ to $(P^{CT}\_Y+1)*SF$, and a z-axis range being $P^{CT}\_Z*SF$ to $(P^{CT}\_Z+1)*SF$;

(6), analyzing porosity of the FIB-SEM data, particularly comprising steps of:

through the step (5), establishing the pixel block in one-to-one correspondence with the micro-CT data in the FIB-SEM high-resolution data; because the FIB-SEM data in the $P^{FIB}$ has a relatively high resolution, processing with hard segmentation; determining a pore part of the FIB-SEM data in the $P^{FIB}$; firstly determining an initial segmentation threshold $Th^{*,FIB}$ wherein a part in the FIB-SEM image of the $P^{FS}$ smaller than $Th^{*,FIB}$ is pores, and a part larger than $Th^{*,FIB}$ is solid matrix; continuously adjusting the segmentation threshold, until a position of the pore edge after finishing segmenting is matched with a position of the pore edge in the original FIB-SEM image of the $P^{FIB}$, and taking the current segmentation threshold as an optimal segmentation threshold. $Th^{FIB}$; after determining the optimal segmentation threshold, segmenting the FIB-SEM image in the $P^{FIB}$, wherein an amount of pixels for pore segmentation is counted to be $Por^{FIB}$, a total pixel amount of the $P^{FIB}$ is counted to be $Pix^{FIB}$, and the porosity of the $P^{FIB}$ is $FP^{FIB}=Por^{FIB}/Pix^{FIB}$;

(7), analyzing a relationship between a grey level of the micro-CT data and the porosity of the FIB-SEM data, particularly comprising steps of:

through the step (5), establishing a one-to-one correspondence relationship between the $P^{CT}$ of the micro-CT data and the $P^{FIB}$ of the FIB-SEM high-resolution data; and, through the step (6), obtaining the porosity $FP^{FIB}$ of the $P^{FIB}$, so as to establish a polynomial fitting relationship $FP^{FIB}=f(G^{CT})$ between the grey level $G^{CT}$ of the $P^{CT}$ and the porosity $FP^{FIB}$ with utilizing a least square method; and (8), establishing a pore structure model with soft segmentation of micro-CT, particularly comprising steps of:

with utilizing the fitting relationship $FP^{FIB}=f(G^{CT})$ between the grey level of the pixel in the micro-CT image and the porosity in the step (7), through introducing a value of the grey level of the micro-CT image, obtaining the porosity of other data in the micro-CT scanning data (namely the data not in the overlap area of FIB-SEM scanning and micro-CT scanning), and obtaining the porosity FP of every pixel in all the micro-CT scanning data; and establishing a pixel matrix FP DATA which has a same size and a one-to-one correspondence with the micro-CT scanning data CT_DATA, wherein a value of the FP_DATA is the porosity FP of the corresponding pixel in the CT_DATA, and FP_DATA is a final outputted soft-segmented pore structure reconstruction model.

For example, in the core micro-CT image analysis obtained by the Zeiss micro-CT scanner, the grey level of 50-60 is generally taken as the division standard of the pores. In the micro-CT image, the part with a grey level smaller than 50-60 is pores, and the part with a grey level larger than 50-60 is solid matrix. Actually, the part with the grey level larger than 50-60 is not all the solid matrix, but a part of pores exist therein. Through the technical solutions of the present invention, the porosity corresponding to the pixel with the grey level larger than 50-60 can be obtained, and the pixel with the grey level larger than 50-60 is not all divided into the solid matrix. Moreover, the present invention is a quantitative analysis method which is established combined with the FIB-SEM high-accuracy scanning data.

What is claimed is:

1. A method for reconstructing a pore structure of a core with micro-CT (Computed Tomography), comprising steps of:

(1), preparing a micro-CT core sample, particularly comprising steps of:

processing a collected primary rock sample with surface mechanical polishing; and, at an area required to develop a micro-CT analysis, drilling to obtain the micro-CT core sample CT_SAMPLE; wherein: the sample has a diameter of CTR mm and an axial length of CTZ mm; for the micro-CT core sample, a first end with a mechanically polished surface is denoted as an A end of the sample, and the other end is denoted as a B end;

(2), processing the micro-CT core sample with surface ion polishing, particularly comprising steps of:

processing the A end of the micro-CT core sample with argon ion surface polishing, wherein a polishing area is an end surface of the whole A end; then processing the end surface of the A end after ion polishing with SEM (Scanning Electron Microscope) scanning; photographing, and obtaining a surface structure image of the end surface of the A end;

(3), punching locating holes and micro-CT scanning, particularly comprising steps of:

according to image results of SEM scanning of the A end, determining a square area SQU with a side length of SEMQ μm on the end surface of the A end; in the square area SQU, selecting three locating points, respectively PA, PB and PC, wherein the three points are required to constitute a rectangular coordinate relation; and, processing the micro-CT core sample CT_SAMPLE after punching the locating holes thereon with micro-CT scanning, wherein a scanning image accuracy is CTN μm, and a scanning result is a three-dimensional pixel matrix CT_DATA;

(4), FIB-SEM (Focused Ion Beam-Scanning Electron Microscope) scanning, particularly comprising steps of:

processing the micro-CT core sample CT_SAMPLE after punching the locating holes thereon with FIB-SEM scanning, wherein: a scanning area is the SQU area; a vertical cut-in depth is SEMQ μm; a horizontal FIB ablation interval is FIBN nm; and an accuracy of FIB-SEM scanning is HIM nm; and, after FIB-SEM scanning, obtaining a cubic core three-dimensional pixel matrix FIB-SEM_DATA with a side length of SEMQ μm;

(5), matching data of micro-CT scanning and FIB-SEM scanning, wherein:

in the step (3), three locating holes are able to be observed in the micro-CT scanning result, respectively $PA^{CT}$, $PB^{CT}$, and $PC^{CT}$; meanwhile, three locating holes are also able to be observed in the FIB-SEM scanning result, respectively $PA^{FIB}$, $PB^{FIB}$, and $PC^{FIB}$; $PA^{CT}$, $PB^{CT}$, and $PC^{CT}$ respectively correspond to $PA^{FIB}$, $PB^{FIB}$, and $PC^{FIB}$; and, according to $PA^{CT}$, $PB^{CT}$, and $PC^{CT}$, $PA^{FIB}$, $PB^{FIB}$, and $PC^{FIB}$, positions of the micro-CT scanning data CT-DATA and the FIB-SEM scanning data FIB-SEM_DATA are matched;

(6), analyzing porosity of the FIB-SEM data, particularly comprising steps of:

through the step (5), establishing a pixel block $P^{FIB}$ in one-to-one correspondence with the micro-CT data in the FIB-SEM high-resolution data; because the FIB-SEM data in the $P^{FIB}$ has a relatively high resolution, processing with hard segmentation; and determining a porosity $FP^{FIB}$ of a pore part of the FIB-SEM data in the $P^{FIB}$;

(7), analyzing a relationship between a grey level of the micro-CT data and the porosity of the FIB-SEM data, particularly comprising steps of:

through the step (5), establishing a one-to-one correspondence relationship between a pixel $P^{CT}$ of the micro-CT data and the $P^{FIB}$ of the FIB-SEM high-resolution data; and, through the step (6), obtaining the porosity $FP^{FIB}$ of the $P^{FIB}$, so as to establish a polynomial fitting relationship $FP^{FIB}=f(G^{CT})$ between the grey level $G^{CT}$ of the $P^{CT}$ and the porosity $FP^{FIB}$ with utilizing a least square method; and (8), establishing a pore structure model with soft segmentation of micro-CT, particularly comprising steps of:

with utilizing the fitting relationship $FP^{FIB}=f(G^{CT})$ between the grey level of the pixel in the micro-CT image and the porosity in the step (7), through introducing a value of the grey level of the micro-CT image, obtaining the porosity of other data in the micro-CT scanning data, and obtaining porosity FP of every pixel in all the micro-CT scanning data; and establishing a pixel matrix FP_DATA which has a same size and a one-to-one correspondence with the micro-CT scanning data CT_DATA, wherein a value of the FP_DATA is the porosity FP of the corresponding pixel in the CT_DATA, and FP_DATA is a final outputted soft-segmented pore structure reconstruction model.

2. The method for reconstructing the pore structure of the core with micro-CT, as recited in claim 1, wherein the step (3) particularly comprises steps of:

(31), according to the image results of SEM scanning of the A end, determining the square area SQU with the side length of SEMQ μm on the end surface of the A end;

(32), in the square area SQU, selecting three locating points, respectively PA, PB and PC, wherein the three points are required to constitute a rectangular coordinate relation;

(33), punching three locating holes of different shapes at positions of the three locating points with a focused ion beam, wherein:

at the PA point, a cylindrical hole with a diameter of 3*CTN μm and an axial length of 3*CTN μm is punched; at the PB point, a cubic hole with a side length of 3*CTN μm is punched; at the PC point, a triangular prism hole with a regular triangle surface is punched, wherein the triangular prism hole has a side length of 3*CTN μM and a vertical depth of 3*CTN μm; and (34), processing the micro-CT core sample CT_SAMPLE after punching the locating holes thereon with micro-CT scanning, wherein the scanning image accuracy is CTN μm, and the scanning result is a three-dimensional pixel matrix CT_DATA.

3. The method for reconstructing the pore structure of the core with micro-CT, as to recited in claim 1, wherein the step (5) particularly comprises steps of:

(51), determining centers of the three locating holes in the micro-CT data; and, through taking a center of the $PA^{CT}$ hole as an origin of a coordinate system, taking $PA^{CT}$-$PB^{CT}$ as an x-axis, taking $PA^{CT}$-$PC^{CT}$ as a y-axis, and taking a direction vertical to the polished surface as a z-axis, establishing a micro-CT data coordinate system CT_SYSTEM;

(52), determining centers of the three locating holes in the FIB-SEM data; and, through taking a center of the $PA^{FIB}$ hole as an origin of a coordinate system, taking $PA^{FIB}$-$PB^{FIB}$ as an x-axis, taking $PA^{FIB}$-$PC^{FIB}$ as a y-axis, and taking a direction vertical to the polished surface as a z-axis, establishing a FIB-SEM data coordinate system FIB_SYSTEM;

(53), $PA^{CT}$, $PB^{CT}$, and $PC^{CT}$ respectively corresponding to $PA^{FIB}$, $PB^{FIB}$, and $PC^{FIB}$, wherein: there is only a scaling factor SF=CTN/FIBN*$10^6$ between the micro-CT data coordinate system CT_SYSTEM and the FIB-SEM data coordinate system FIB_SYSTEM; and (54), in an overlap area of FIB-SEM scanning and micro-CT scanning, coordinates of one pixel $P^{CT}$ in the micro-CT data in the micro-CT data coordinate system CT_SYSTEM being $P^{CT}\_X$, $P^{CT}\_Y$, and $P^{CT}\_Z$; because the FIB-SEM data has higher resolution than the micro-CT data, for the pixel block $P^{FIB}$ in the FIB-SEM data corresponding to one pixel $P^{CT}$ in the micro-CT data, an x-axis range being $P^{CT}\_X$*SF to $(P^{CT}\_X+1)$*SF, a y-axis range being $P^{CT}\_Y$*SF to $(P^{CT}\_Y+1)$*SF, and a z-axis range being $P^{CT}\_Z$*SF to $(P^{CT}\_Z+1)$*SF.

4. The method for reconstructing the pore structure of the core with micro-CT, as recited in claim 1, wherein the step (6) particularly comprises steps of:

(61), determining an initial segmentation threshold $Th^{*,FIB}$, wherein a part in the FIB-SEM image of the $P^{FIB}$ smaller than $Th^{*,FIB}$ is pores, and a part larger than $Th^{*,FIB}$ is solid matrix; continuously adjusting the segmentation threshold, until a position of a pore edge after finishing segmenting is matched with a position of a pore edge in the original FIB-SEM image of the $P^{FIB}$, and taking the current segmentation threshold as an optimal segmentation threshold $Th^{FIB}$; and (62), after determining the optimal segmentation threshold, segmenting the FIB-SEM image in the $P^{FIB}$, wherein an amount of pixels for pore segmentation is counted to be $Por^{FIB}$, a total pixel amount of the $P^{FIB}$ is counted to be $Pix^{FIB}$, and the porosity of the $P^{FIB}$ is $FP^{FIB}=Por^{FIB}/Pix^{FIB}$.

* * * * *